April 6, 1954 M. L. SWIRE 2,674,161
LATHE ATTACHMENT
Filed July 9, 1952
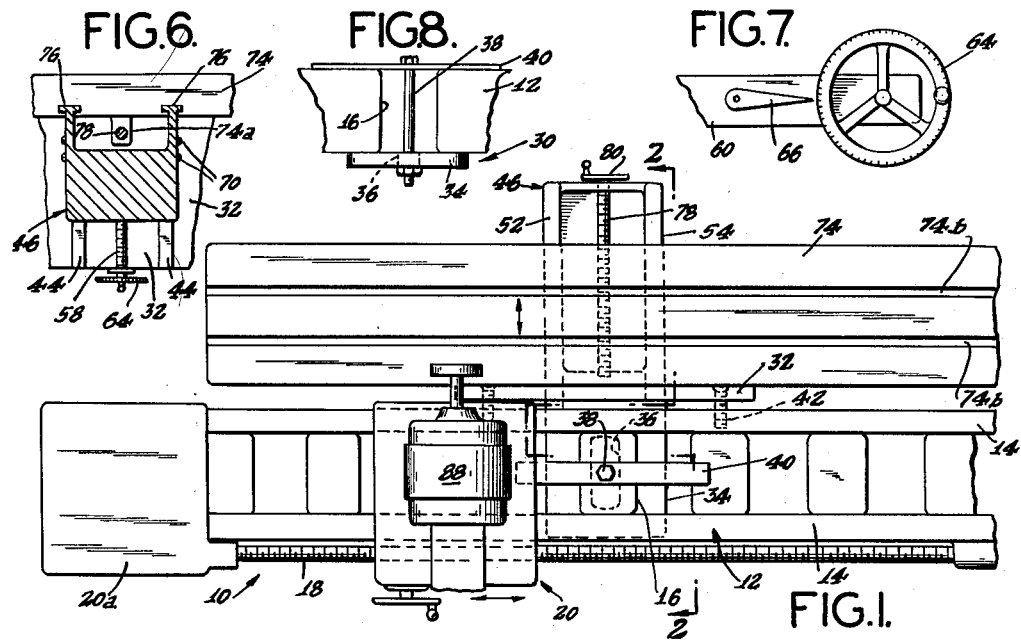
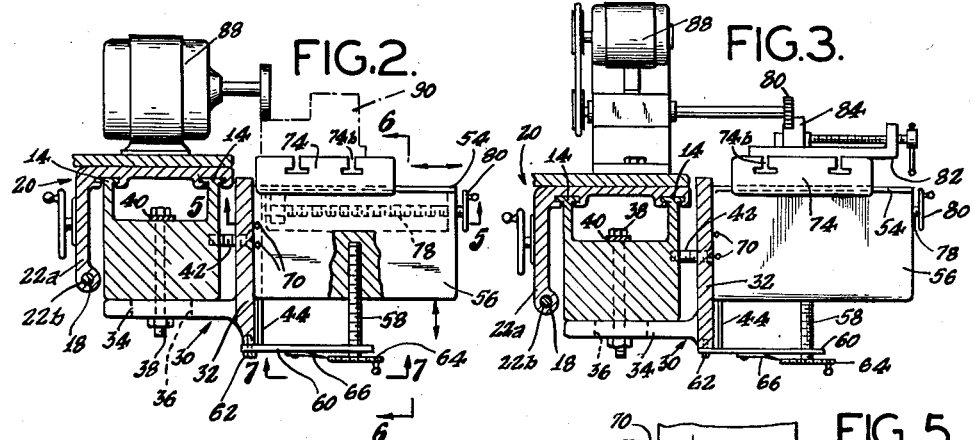
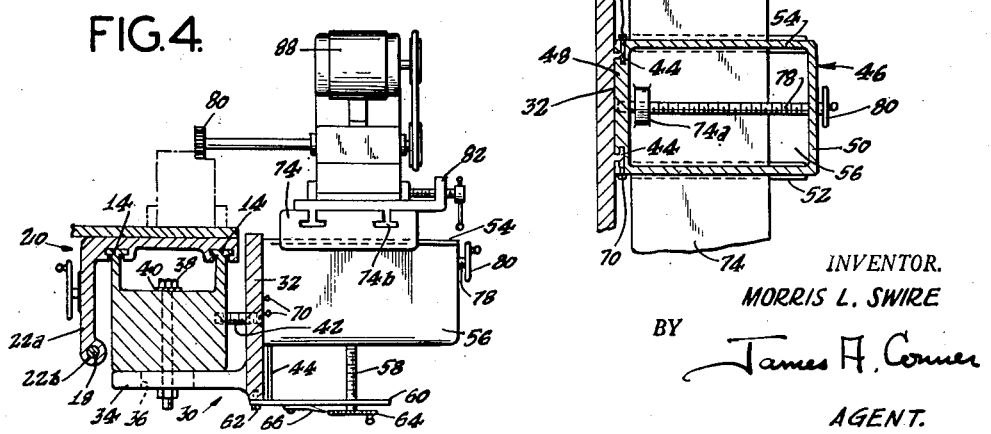
INVENTOR.
MORRIS L. SWIRE
BY James H. Conner
AGENT.

Patented Apr. 6, 1954

2,674,161

UNITED STATES PATENT OFFICE 2,674,161

LATHE ATTACHMENT

Morris L. Swire, Scotia, N. Y.

Application July 9, 1952, Serial No. 297,915

3 Claims. (Cl. 90—15)

This invention relates generally to lathe attachments and in particular to a lathe attachment that selectively supports work or tools.

The present device is adapted for use on a conventional lathe wherein a tool supporting compound mounted on a carriage is capable of traversing the length of the lathe bed. When so employed, the present invention provides means whereby the entire length of the lathe bed may be utilized for work operations not generally performed on a conventional lathe. The instant device comprises a bed-length table attachable to the lathe bed and adjustable vertically and horizontally relative thereto. Thus, work may be secured either on the lathe carriage compound or on the table and the tools oppositely mounted relative thereto with unrestricted tool operations capable throughout the length of the lathe bed.

Heretofore, grinding or milling attachments for lathes permitted limited travel of the tool relative to the work. The present invention provides many advantages over the prior art in that multiple adjustments may be made to accurately position the work relative to the tool in such milling or grinding operations whereby tolerances to a desired accuracy can be maintained while performing said operations throughout the length of the lathe bed.

Therefore, one of the principal objects of the invention resides in the provision of means for selectively supporting work or tools, attachable to the bed of a lathe and capable of performing multiple work operations throughout the length of said lathe bed.

Another object resides in the provision of adjustable means to accurately position said supporting means in parallel planar offset relation to the bed of the lathe to which it is attached.

A further object is to provide a lathe attachment having means to support either tools or work cooperable to perform work operations in a selectable and variable relationship throughout the length of the lathe bed.

And still another object resides in the provision of means to selectively and adjustably position the present attachment relative to the axis of the lathe bed; and Other ancillary objects will be, in part, hereinafter apparent and in part hereinafter pointed out.

In the drawings:

Fig. 1 is a plan view of the present invention attached to the bed of a conventional lathe illustrating a self-powered grinder mounted on the lathe compound.

Fig. 2 is a cross-section taken along line 2—2 of Fig. 1.

Fig. 3 is a cross-section illustrating a milling cutter mounted on the lathe compound with work secured to the auxiliary table.

Fig. 4 is a cross-section similar to Fig. 3 but showing the milling cutter mounted on the auxiliary table while the work is secured to the lathe compound.

Fig. 5 is a bottom view taken in cross-section along line 5—5 of Fig. 2.

Fig. 6 is a cross-section taken along line 6—6 of Fig. 2.

Fig. 7 is a detail view of the vertical adjusting means and associated indicator.

Fig. 8 is an enlarged fragmentary view of the means for attaching the invention to a lathe.

Referring to the drawings in detail, 10 generally designates a conventional lathe having a bed structure 12 provided with raised rails 14. Interposed between rails 14 and formed in the base of the bed 12 are apertures 16. Further, there is usually provided a rotatable screw feed shaft 18 variably driven by gear reduction box 20a. Rotatable screw feed shaft 18 has a threaded periphery on which the depending portion 22a of carriage 20 is complementally mounted, i. e., a threaded aperture 22b therein engages the threads on shaft 18. Thus, rotation of shaft 18 effects lateral movement of carriage 20 along rails 14. The selectivity of gear box 20a provides for multiple speeds of rotation and therefore, controls the speed of carriage movement. A cutting tool, not shown, may be secured on carriage 20 for engagement with a piece of work disposed between centers, also not shown. The aforesaid structure is conventional to the present-day commercial lathes and it is such a lathe on which the present invention is applied.

The instant invention generally comprises a main supporting bracket 30 formed by casting or the like, having a vertical portion 32 and horizontal portion 34 extending forwardly therefrom. Horizontal portion 34 is provided with an elongated slot 36 for adjustably securing bracket 30 to the lathe bed 12. As shown in Fig. 8 of the drawing, a bolt 38 is arranged to pass through a flat metal strip 40 disposed across an aperture 16 in the base of bed 12 and extend through said aperture and slot 36 of the bracket portion 34 disposed below the bed 12. Tightening of a nut on the depending bolt 38 thereby secures bracket 30 to the bed of the lathe. Further, vertical portion 32 may be provided with apertures 32a through which screws 42 may extend to be threadably secured to bed 12 and provide additional structural support for said bracket.

Formed integrally with bracket 30 and extending laterally from the rear surface of vertical portion 32 are spaced vertical rails 44 of substantially T-shaped cross-section. Rails 44 extend from the lower margin of vertical portion 32 to the upper margin thereof and provide guide means for vertically adjusting a table support member 46. Member 46 is of substantial rectangular formation with a front wall 48, a rear wall 50, interconnecting side walls 52 and 54, and a bottom wall 56, respectively. Front wall 48 has milled in the outer surface therof, a pair of spaced T-shaped channels complemental to the rails 44 and arranged to be disposed thereon.

Means are provided to adjustably position member 46 on rails 44 and to this end, there is provided a manually rotatable threaded shaft 58 journalled in a rearwardly extending plate 60 secured to the lower margin of vertical bracket portion 32, as by screws 62. A knob 64 is secured on one end of shaft 58 and the other end of said shaft is threaded in a complementally threaded aperture provided in the relatively thick bottom wall 56 of member 46. Thus, manual rotation of knob 64 effectively raises or lowers member 46 on the bracket rails 44.

A pointer 66 affixed to the lower side of plate 60 provides a reference point for graduated indicia 68 on knob 64, Fig. 7.

It may be pointed out at this time, that screws 70 mounted in suitably threaded apertures in the side walls 52 and 54 of member 46 may be turned into engagement with rails 44 and thereby lock said member in a selected position.

Means are provided to adjustably secure a work table 74 to the member 46. Directed toward this end are a pair of horizontal rails 72, also of substantial T-shaped cross-section, formed along the upper margins of side walls 52—54, respectively, of member 46. Complemental slots 76 in work table 74 are arranged to receive the respective rails 72 therein and thus slidably support table 74 thereon. Further, a manually rotatable threaded shaft 78 is journalled in the respective front and rear walls 48—50 of member 46. Disposed for threaded engagement therewith is a protrusion 74a depending from work table 74. A suitably threaded aperture in protrusion 74a receives shaft 78 therein and thereby moves work table 74 along the axis of shaft 78 as said shaft rotates. A knob 80 secured to shaft 78 is provided to facilitate manual rotation thereof.

It is readily apparent that the plane of work table 74 may be adjusted vertically by means of knob 64 and may be adjusted horizontally by means of knob 80.

A conventional tool compound vice 82 may be slidably mounted in channels 74b provided in the work table 74 and secured therein by bolts or the like, not shown. Fig. 3 illustrates such an arrangement, wherein a piece of work 84 is secured in compound vice 82 for engagement with a milling tool designated as 86. It will be noted that the milling attachment is mounted on the movable lathe carriage 20 and may be moved as desired across the work piece 84. Or conversely, as shown in Fig. 4, the milling attachment may mounted on the work table 74 and the work piece 84 mounted on the movable carriage 20. Either of said alternate arrangements provides means, hereinbefore described, whereby accurate work operations may be controlled by vertical and horizontal adjustment of table 74.

Further, it will be noted that a grinding attachment 88 may be mounted on the movable carriage 20 for grinding of work piece 90 with the aforesaid adjustments available for accurate grinding control.

Having thus described the invention, it is evident that the several objects have been achieved and that the device is efficient and conditioned for practical use.

While a preferred embodiment of the invention has been described herein, it is understood to be illustrative and not limited thereto except by the appended claims.

The invention claimed is:

1. In combination, a universal type lathe attachment for selectively supporting in vertical and horizontal relationship, an article for work operations on a lathe, comprising a support member having an upright frame portion and integrally formed horizontal portion extending forwardly at the base thereof, said horizontal portion being provided with an elongated aperture disposed lengthwise at right angles to the vertical frame portion and centrally located in said horizontal portion, said horizontal portion being adapted to nest on the bed of a lathe whereby a bolt passing through said aperture may secure said support member in adjustable relation to the bed of the lathe, a pair of spaced parallel T-shaped rails secured to and disposed vertically on the vertical frame portion and extending rearwardly therefrom, a table supporting member having a pair of spaced parallel T-shaped recesses therein complemental to said rails and adapted to receive said rails therein for vertical sliding movement thereon, a plate secured to the base of said vertical frame member and rearwardly extending at right angles thereto, a rotatable screw-threaded member journalled in said plate and threadedly attached to said table supporting member, whereby manual rotation of said rotatable screw threaded member will raise and lower said table supporting member relative to the fixed vertical frame portion.

2. In combination, a universal type lathe attachment for selectively supporting in vertical and horizontal relationship, an article for work operations on a lathe, comprising a support member having an upright frame portion and integrally formed horizontal portion extending forwardly at the base thereof, said horizontal portion being provided with an elongated aperture disposed lengthwise at right angles to the vertical frame portion and centrally located in said horizontal portion, said horizontal portion being adapted to nest on the bed of a lathe whereby a bolt passing through said aperture may secure said support member in adjustable relation to the bed of the lathe, a pair of spaced parallel T-shaped rails secured to and disposed vertically on the vertical frame portion and extending rearwardly therefrom, a table supporting member having a pair of spaced parallel T-shaped recesses therein complemental to said rails and adapted to receive said rails therein for vertical sliding movement thereon, a plate secured to the base of said vertical frame member and rearwardly extending at right angles thereto, a rotatable screw-threaded member journalled in said plate and threadedly attached to said table supporting member, whereby manual rotation of said rotatable screw threaded member will raise and lower said table supporting member relative to the fixed vertical frame portion, a horizontal screw threaded member rotatably journalled in said work supporting member, a pair of spaced parallel T-shaped rails integrally formed with said table supporting member and disposed in horizontal relation thereon and extending at right angles to the vertical frame portion, and means dependent from a work table co-operable with said horizontal screw threaded member whereby rotation of said horizontal screw threaded member effectively slides said work table on said horizontal rails in horizontal relation to and from said vertical frame portion.

3. In combination, a universal type lathe attachment for selectively supporting in vertical and horizontal relationship, an article for work operations on a lathe, comprising a support member having an upright frame portion and integrally formed horizontal portion extending forwardly at the base thereof, said horizontal portion being provided with an elongated aperture disposed lengthwise at right angles to the vertical frame portion and centrally located in said horizontal portion, said horizontal portion being adapted to nest on the bed of a lathe whereby a bolt passing through said aperture may secure said support member in adjustable relation to the bed of the lathe, a pair of spaced parallel T-shaped rails secured to and disposed vertically on the vertical frame portion and extending rearwardly therefrom, a table supporting member having a pair of spaced parallel T-shaped recesses therein complemental to said rails and adapted to receive said rails therein for vertical sliding movement thereon, a plate secured to the base of said vertical frame member and rearwardly extending at right angles thereto, a rotatable screw-threaded member journalled in said plate and threadedly attached to said table supporting member, whereby manual rotation of said rotatable screw threaded member will raise and lower said table supporting member relative to the fixed vertical frame portion, a horizontal screw threaded member rotatably journalled in said work supporting member, a pair of spaced parallel T-shaped rails integrally formed with said table supporting member and disposed in horizontal relation thereon and extending at right angles to the vertical frame portion, and means dependent from a work table co-operable with said horizontal screw threaded member whereby rotation of said horizontal screw threaded member effectively slides said worktable on said horizontal rails in horizontal relation to and from said vertical frame portion, and means to lock said table supporting member in selected vertical and horizontal positions.

References Cited in the file of this patent

UNITED STATES PATENTS

| Number | Name | Date |
|---|---|---|
| 741,209 | Wright | Oct. 13, 1903 |
| 2,099,198 | Culp | Nov. 16, 1937 |
| 2,343,164 | Woszczyna | Feb. 29, 1944 |

FOREIGN PATENTS

| Number | Country | Date |
|---|---|---|
| 20,534 | Great Britain | Oct. 29, 1903 |
| 188,417 | Great Britain | Nov. 16, 1922 |
| 226,734 | Switzerland | Apr. 10, 1942 |